United States Patent
Berdugo et al.

(10) Patent No.: US 11,348,089 B2
(45) Date of Patent: May 31, 2022

(54) SYSTEM AND METHODS FOR PROVIDING AUDIBLE INSTRUCTIONS FOR PERFORMING A TRANSACTION

(71) Applicant: Mastercard International Incorporated, Purchase, NY (US)

(72) Inventors: Andrea Catalina Berdugo, Maryland Heights, MO (US); Christopher T. Scholl, Saint Peter's, MO (US); Adam Michael Sommer, Brentwood, MO (US)

(73) Assignee: Mastercard International Incorporated, Purchase, NY (US)

( * ) Notice: Subject to any disclaimer, the term of this patent is extended or adjusted under 35 U.S.C. 154(b) by 35 days.

(21) Appl. No.: 16/662,320

(22) Filed: Oct. 24, 2019

(65) Prior Publication Data

US 2020/0134597 A1    Apr. 30, 2020

Related U.S. Application Data

(60) Provisional application No. 62/570,918, filed on Oct. 26, 2018.

(51) Int. Cl.
| | |
|---|---|
| *G06Q 20/20* | (2012.01) |
| *G10L 15/22* | (2006.01) |
| *G06Q 20/40* | (2012.01) |
| *G10L 13/02* | (2013.01) |
| *G06Q 20/32* | (2012.01) |
| *G09B 21/00* | (2006.01) |

(52) U.S. Cl.
CPC ......... *G06Q 20/3227* (2013.01); *G06Q 20/20* (2013.01); *G09B 21/009* (2013.01); *G10L 13/02* (2013.01)

(58) Field of Classification Search
None
See application file for complete search history.

(56) References Cited

U.S. PATENT DOCUMENTS

| | | | | |
|---|---|---|---|---|
| 10,349,122 | B2* | 7/2019 | Shintani | H04R 25/407 |
| 10,489,833 | B2* | 11/2019 | Shennib | H04R 25/30 |
| 10,565,985 | B1* | 2/2020 | Huang | G10L 15/18 |
| 10,847,143 | B2* | 11/2020 | Millington | G06F 3/167 |
| 11,197,096 | B2* | 12/2021 | Woo | G10L 15/28 |
| 2011/0184824 | A1* | 7/2011 | George | G01D 5/39 |
| | | | | 705/24 |

(Continued)

*Primary Examiner* — Christopher Bridges
*Assistant Examiner* — Tony P Kanaan
(74) *Attorney, Agent, or Firm* — Hovey Williams LLP

(57) ABSTRACT

Methods and systems for hearing-impaired payment applications are provided herein. In particular, a method for performing a transaction using a hearing device payment system is provided that includes a hearing device and a cardholder computing device. The method includes pairing the hearing device to the cardholder computing device by means of a wireless communication protocol. A payment application on the cardholder computing device is started to perform a transaction. A cardholder initiates an audible instruction function of the payment application. In addition, the payment application transmits a digital audio signal to the hearing device by means of the wireless communication protocol. The digital audio signal provides an audible instruction to the cardholder via the hearing device.

12 Claims, 7 Drawing Sheets

(56) References Cited

U.S. PATENT DOCUMENTS

| | | | |
|---|---|---|---|
| 2016/0148182 A1* | 5/2016 | Craine | G06Q 20/401 |
| | | | 705/16 |
| 2017/0092269 A1* | 3/2017 | Haubrich | H04L 12/282 |
| 2017/0325033 A1* | 11/2017 | Aubreville | H04M 1/6016 |
| 2018/0261224 A1* | 9/2018 | Huang | G10L 15/083 |
| 2019/0114623 A1* | 4/2019 | Wurmfeld | G06Q 20/3552 |
| 2019/0221208 A1* | 7/2019 | Chen | G10L 15/22 |
| 2020/0117690 A1* | 4/2020 | Tran | G06F 16/90332 |
| 2020/0184980 A1* | 6/2020 | Wilberding | G10L 15/30 |

* cited by examiner

SYSTEM AND METHODS FOR PROVIDING AUDIBLE INSTRUCTIONS FOR PERFORMING A TRANSACTION

RELATED APPLICATION

This application claims the priority benefit of U.S. Provisional Patent Application Ser. No. 62/750,918 entitled "SYSTEM AND METHODS FOR PROVIDING AUDIBLE INSTRUCTIONS FOR PERFORMING A TRANSACTION," filed Oct. 26, 2018, the entire disclosure of which is incorporated herein by reference.

FIELD OF THE DISCLOSURE

The field of the disclosure relates generally to payment systems and methods for hearing-impaired transactions and, more particularly, to systems and methods for providing audible and/or visual instructions to a hearing-impaired cardholder from a digital wallet.

BACKGROUND

People with hearing-impaired issues generally have difficulties carrying out commercial transactions and working with existing payment applications in today's retail settings. Typically, these transactions are not designed to facilitate the needs of hearing-impaired individuals. Consequently, people with hearing disabilities may struggle at Point-of-Sale (POS) devices because they can't adequately communicate with these devices, thereby resulting in an unpleasant shopping experience.

Hearing aids and implants have been developed to compensate for hearing losses in individuals. Conventionally, hearing aids and implants detect sound with the use of a microphone, which converts the sound into an analog signal. Hearing aids often include an analog-to-digital converter to convert the analog signal into a digital representation, which can be processed by the digital signal processor as programmed by an audiologist. Typically, such programming adjusts the digital representation to compensate for the user's hearing impairments.

Many in the deaf community who have chosen to use an implant (such as hearing implants known under the designation of cochlear implant) are often challenged understanding sound in public spaces, especially in retail environments, where background noise can be excessive. Such individuals often struggle to clearly hear or understand instructions given by a store clerk who may be assisting with a payment transaction process.

Despite the advancements made to assist hearing-impaired individuals, further advancements are needed in regard to payment systems and applications.

BRIEF DESCRIPTION

This summary is not intended to identify essential features of the present invention and is not intended to be used to limit the scope of the claims. These and other aspects of the present invention are described below in greater detail.

In one or more embodiments, a method for performing a transaction using a hearing device payment system is provided. The hearing device payment system includes a hearing device and a cardholder computing device. The method includes pairing the hearing device to the cardholder computing device by means of a wireless communication protocol. The method also includes starting a payment application on the cardholder computing device to perform a transaction. In addition, the method includes receiving input initiating an audible instruction function of the payment application. Furthermore, the method includes transmitting a digital audio signal to the hearing device by means of the wireless communication protocol. The digital audio signal provides an audible instruction to a cardholder via the hearing device.

In one or more embodiments, a computer-implemented method for performing a hearing-impaired transaction is provided. Generally, the method comprises the steps of: (a) starting a payment application on a cardholder computing device, wherein the payment application comprises a hearing-impaired functionality; (b) activating the hearing-impaired functionality on the payment application; and (c) receiving a hearing-impaired communication from the payment application.

In one or more embodiments, a hearing-impaired payment system is provided. Generally, the hearing-impaired payment system comprises: (a) a memory device for storing data; and (b) a processor communicatively coupled to the memory device, wherein the processor may be programmed to: (i) start a payment application on a cardholder computing device, wherein the payment application comprises a hearing-impaired functionality; (ii) activate the hearing-impaired functionality on the payment application; and (iii) receive a hearing-impaired communication from the payment application.

In one or more embodiments, a non-transitory computer-readable storage media having computer-executable instructions for facilitating a hearing-impaired transaction is provided. When executed by at least one processor, the computer-executable instructions cause the processor to: (a) start a payment application on a cardholder computing device, wherein the payment application comprises a hearing-impaired functionality; (b) activate the hearing-impaired functionality on the payment application; (c) transmit a payment credential from the payment application to a point-of-sale device; and (d) receive a hearing-impaired communication from the payment.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
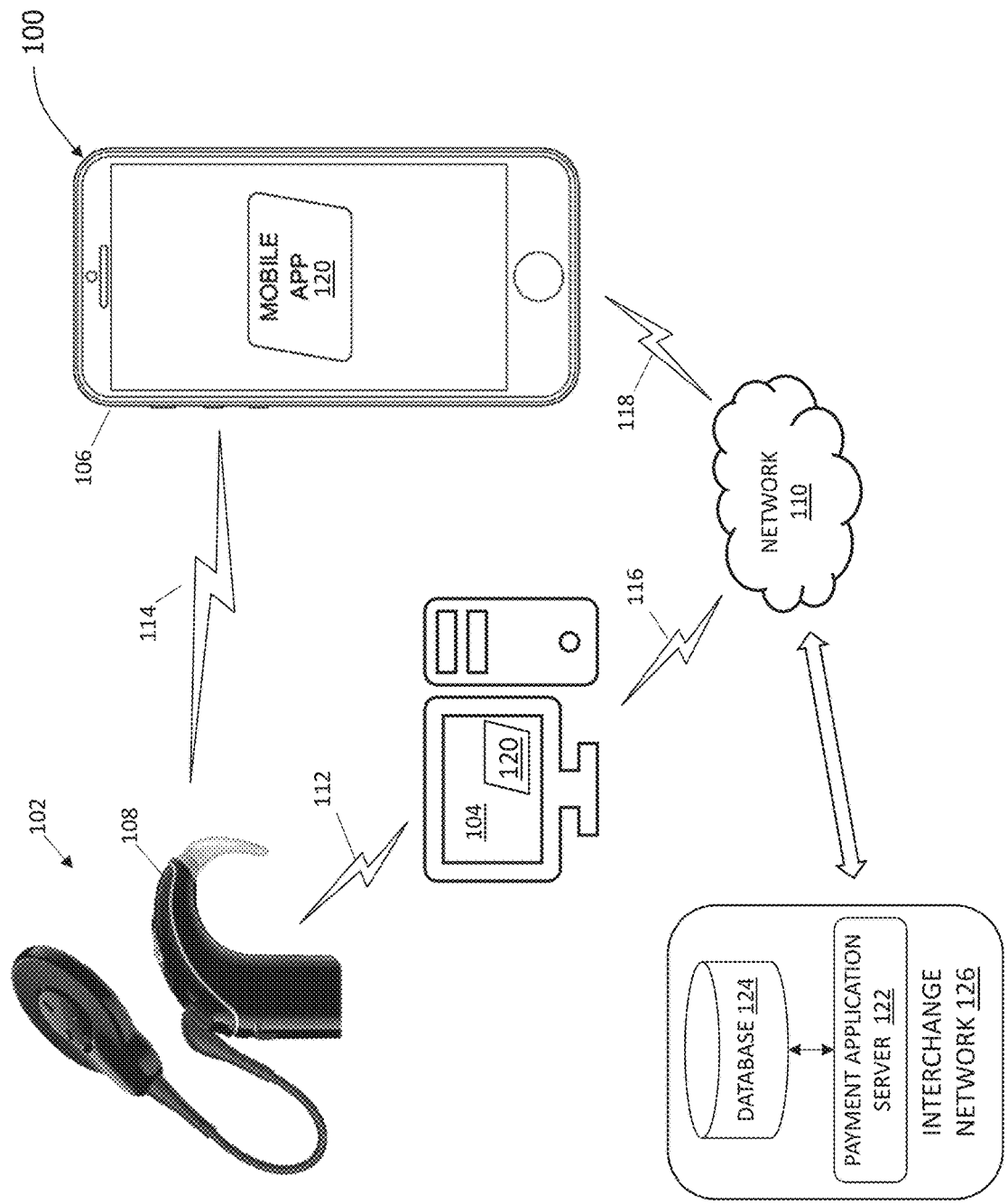
FIG. 1 is a simplified block diagram of an exemplary hearing device payment system including a hearing device in accordance with one embodiment of the present disclosure.

The figures depict exemplary embodiments for purposes of illustration only. The figures are not intended to limit the present invention to the specific embodiments they depict. One skilled in the art will readily recognize from the following discussion that alternative embodiments of the systems and methods illustrated herein may be employed without departing from the principles of the invention described herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled. It is contemplated that the disclosure has general application to providing digital data streams to hearing devices in industrial, commercial, and residential applications.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments but is not necessarily included. Thus, particular implementations of the present disclosure can include a variety of combinations and/or integrations of the embodiments described herein.

In the past, cardholders with hearing-impaired issues have experienced difficulties carrying out commercial transactions and working with most existing POS devices in today's retail settings. Generally, most POS devices and payment applications are not designed to facilitate the technical needs of hearing-impaired individuals. Consequently, cardholders with hearing disabilities may experience additional hardships at POS devices because they can't adequately communicate with these devices, thereby resulting in an unpleasant shopping experience. Furthermore, current payment applications available to hearing-impaired cardholders have not been able to facilitate the unique technical needs of these cardholders and permit hearing-impaired communications between the cardholder and the POS devices. However, the payment application of the present invention is able to address these shortcomings of previous payment applications.

The present invention generally relates to systems and methods for providing assistance to a disabled cardholder from a digital wallet application on a cardholder's device. As described further below, the digital wallet payment application may contain a hearing-impaired functionality that can be enabled by the disabled cardholder. This disability functionality allows the disabled cardholder to indicate their disabilities (e.g., hearing-impaired). Consequently, this will cause the digital wallet payment application to alter any ongoing communications with a merchant device (e.g., a point-of-sale device) in a way so as to facilitate the hearing-impaired cardholder's needs. For example, when the hearing-impaired functionality is enabled on the digital wallet payment application, all communications between the cardholder's device and the merchant device may then be provided via a chat session through a chatbot, as text messages, and/or as auditory messages to the disabled cardholder.

FIG. 1 is a simplified block diagram of an exemplary hearing device payment system 100 including a hearing device 102 in accordance with one embodiment of the present disclosure. The hearing device payment system 100 may be utilized by cardholders (not shown in FIG. 1) as part of a process of performing an electronic transaction facilitated by transmission of a selected digital stream to the hearing device 102 as described herein. In addition to the hearing device 102, the hearing device payment system 100 includes one or more of a cardholder computer system 104 and/or a cardholder mobile computing device 106, which the cardholder may use to transmit audible instructions from a digital wallet system or payment application 120 on which is stored payment account information and a hearing-impaired functionality (e.g., a Masterpass® brand system; Masterpass is a registered trademark of Mastercard International Incorporated).

In the exemplary embodiment, the hearing device 102 is illustrated and described herein as an implantable hearing device, i.e., a cochlear implant. However, it is noted that the hearing device 102 may be any hearing device that enables the hearing device payment system 100 to operate as described herein. For example, the hearing device 102 may include, without limitation, behind the ear hearing aids, in the ear hearing aids, receiver in the ear hearing aids, middle ear implants, electro-acoustic stimulation implants, cochlear implants, auditory brainstem implants, and the like.

As illustrated in FIG. 1, the hearing device 102 includes a controller 108 configured to communicate with the cardholder computer system 104 and/or the cardholder mobile computing device 106 via a wireless connection 112 and/or a wireless connection 114, respectively. That is, the controller 108 may communicate (e.g., transmit and/or receive) various digital data stream, including a digital audio signal, with the cardholder computer system 104 and/or the cardholder mobile computing device 106. The wireless connections 112 and 114 may be established between the controller 108 and the cardholder computer system 104 and/or the cardholder mobile computing device 106 via a Bluetooth communication protocol. When the controller 108 and the cardholder computer system 104 and/or the cardholder mobile computing device 106 communicate with each other via the wireless connections 112 and 114, a connection procedure necessary for a corresponding communication method may be performed. For example, and without limitation, when the controller 108 and the cardholder computer system 104 and/or the cardholder mobile computing device 106 attempt to communicate, a pairing procedure necessary for a Bluetooth communication protocol may be initiated by the controller 108 and/or the respective cardholder computer system 104 or cardholder mobile computing device 106.

In the exemplary embodiment, the cardholder computer system 104 and the cardholder mobile computing device 106 are also configured to communicate with a communications network 110 via a wireless signal 116 and a wireless signal 118, respectively. The communications network 110 includes, for example and without limitation, one or more of a local area network (LAN), a wide area network (WAN) (e.g., the Internet, etc.), a mobile network, a virtual network, and/or any other suitable public and/or private network capable of facilitating a wireless communication link with the cardholder computer system 104 and/or the cardholder mobile computing device 106. In some embodiments, the communications network 110 may include more than one type of network, such as a private payment transaction network provided by an interchange network 126 to merchant acquirers (not shown in FIG. 1) and payment card issuers (not shown in FIG. 1) and, separately, the public Internet, which may facilitate communication between a merchant (not shown in FIG. 1) and one or more of the cardholder computer systems 104 and/or cardholder mobile computing devices 106.

In the exemplary embodiment, the cardholder computer systems 104 and the cardholder mobile computing devices 106 may be any device capable of interconnecting to the Internet including mobile computing devices, such as a laptop or desktop computer, a web-based phone (e.g., a "smart phone"), a personal digital assistant (PDA), a tablet or phablet, a web-connectable appliance, a "smart watch" or other wearable device, or other web-connectable equipment. It should be understood that the hearing device payment system 100 may include any number of cardholder computer systems 104 and cardholder mobile computing devices 106.

The hearing device payment system 100 also includes a payment application server 122. The payment application server 122 includes at least one processor (not shown in FIG. 1) in communication with a database 124. The database 124 contains information on a variety of matters, including, for example, one or more cardholder profiles, payment account data for a cardholder's payment accounts, and other information described herein. In one embodiment, the database 124 is stored on the payment application server 122. In an alternative embodiment, the database 124 is stored remotely from the payment application server 122 and may be non-centralized. In the example embodiment, the payment application server 122 is integral to and/or associated with the payment or interchange network 126, which is described further herein.

In the example embodiment, the payment application server 122 receives payment card data for the cardholder's one or more payment cards from the cardholder via the cardholder computer systems 104 and the cardholder mobile computing devices 106. The payment card data is stored by the payment application server 122 in the database 124.

Embodiments described herein may relate to a transaction card system, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated.

Figure 2:
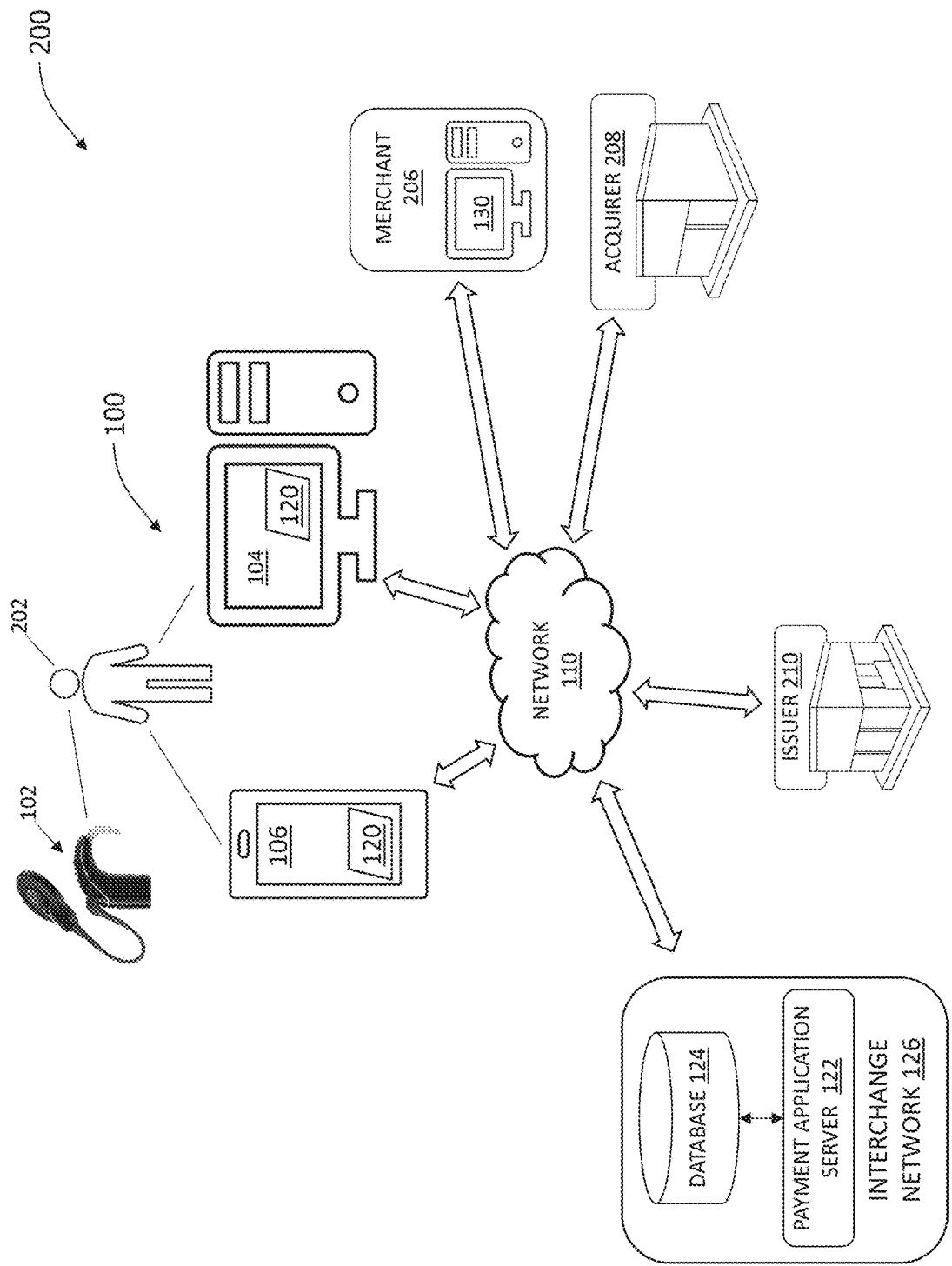
FIG. 2 is a simplified block diagram of an exemplary payment card network system including the hearing device payment system of FIG. 1.

FIG. 2 is a simplified block diagram of an exemplary payment card network system 200 including the hearing device payment system 100 in accordance with one embodiment of the present disclosure. The payment card network system 200 may be utilized by consumers and merchants as part of a process of initiating an authorization request and performing a transaction concurrent with delivery of goods or services as described herein via the interchange network 126. In addition, the payment card network system 200 is a transaction card account system including the cardholder mobile computing device 106 and the cardholder computer system 104, which the cardholder 202 may use either to conduct electronic transactions and/or record payments for electronic transactions related to purchase of a merchant's goods or services. It should be understood that the various components shown in FIG. 2 may be a subset of a larger system.

The payment card network system 200 enables payment-by-card transactions in which merchants 206, acquirers 208, and/or card issuers 210 do not need to have a one-to-one relationship. Although parts of the payment card network system 200 are presented in one arrangement, other embodiments may include the same or different parts arranged otherwise, depending, for example, on authorization processes for purchase transactions, communication between computing devices, etc.

In the example embodiment, the payment card network system 200 generally includes the cardholder mobile computing device 106, the cardholder computer system 104, merchants 206, acquirers 208, issuers 210, and the interchange network 126 coupled in communication via the communications network 110.

In a typical transaction card system, a financial institution called the "issuer" issues a transaction card, such as a credit card, to a consumer such as the cardholder 202, who uses the transaction card to tender payment for a purchase from the merchant 206. The cardholder 202 may input information from a transaction card into the cardholder mobile computing device 106 and/or cardholder computer system 104 and store the information as digital wallet data 406 (broadly, payment credentials) (shown in FIG. 4). The merchant 206 is typically associated with products, for example, and without limitation, goods and/or services, that are offered for sale and are sold to the cardholder 202. The merchant 206 includes, for example, a physical location and/or a virtual location such as an Internet-based store-front.

To accept payment from the cardholder 202, for example, with the digital wallet data 406, the merchant 206 must normally establish an account with a financial institution that is part of the payment card network system 200. This financial institution is usually called the "merchant bank," the "acquiring bank," or the acquirer 208. When the cardholder 202 submits payment for a purchase with the cardholder mobile computing device 106 and/or the cardholder computer system 104 using the digital wallet data 406, the merchant 206 requests authorization from the acquirer 208 for the purchase. The request may be performed over a telephone but is usually performed using a point-of-sale terminal that reads the cardholder's account information from a magnetic stripe, a chip, embossed characters on the transaction card, or digital wallet data and communicates electronically with the transaction processing computers of the acquirer 208. Alternatively, the acquirer 208 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 126, computers of the acquirer 208 or merchant processor will communicate with computers of the issuer 210 to determine whether the cardholder's account is in good standing and whether the purchase is covered by the cardholder's available credit line. Based on these determinations, the request for authorization will be declined or accepted. If the request is accepted, an authorization code is issued to the merchant 206.

When a request for authorization is accepted, the available credit line of the cardholder's account is decreased. Normally, a charge for a payment card transaction is not posted immediately to the cardholder's account because bankcard associations, such as Mastercard International Incorporated, have promulgated rules that do not allow the merchant 206 to charge, or "capture," a transaction until the purchased goods are shipped or the purchased services are delivered. However, with respect to at least some debit card transactions, a charge may be posted at the time of the transaction. When the merchant 206 delivers the purchased products, the merchant 206 captures the transaction, for example, by appropriate data entry procedures on a point-of-sale terminal. This may include bundling of approved transactions daily for standard retail purchases. If the cardholder 202 cancels a transaction before it is captured, a "void" is generated. If the cardholder 202 returns goods after the transaction has been captured, a "credit" is generated. The interchange network 126 and/or the issuer 210 stores the transaction card information, such as, and without limitation, a type of merchant, a merchant identifier, a location where the transaction was completed, an amount of purchase, and a date and time of the transaction, in the database 124.

After a purchase has been made, a clearing process occurs to transfer additional transaction data related to the purchase among the parties to the transaction, such as the acquirer 208, the issuer 210, and the interchange network 126. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer 210, the cardholder's account is decreased. Normally, a charge is posted immediately to the cardholder's account. The interchange network 126 transmits the approval to the acquirer 208 for distribution of goods/services or information, or cash in the case of an automated teller machine (ATM).

After a transaction is authorized and cleared, the transaction is settled among the merchant 206, the acquirer 208, and the issuer 210. Settlement refers to the transfer of financial data or funds among the merchant's account, the acquirer 208, and the issuer 210 related to the transaction. Usually, transactions are captured and accumulated into a "batch," which is settled as a group. More specifically, a transaction is typically settled between the issuer 210 and the interchange network 126, and then between the interchange network 126 and the acquirer 208, and then between the acquirer 208 and the merchant 206. It should be appreciated that more or less information related to transactions, as part of either authorization, clearing, and/or settling, may be included in the transaction data and stored within the database 124, at the merchant 206, the acquirer 208, the payment network 112, and/or the issuer 210. Further, transaction data, unrelated to a particular payment account, may be collected by a variety of techniques, and similarly stored within the database 124.

In some embodiments, cardholders 202 involved in the transactions described herein may be prompted to agree to legal terms associated with their payment accounts, for example, during enrollment in such payment accounts, etc. As such, the cardholder 202 may voluntarily agree to allow the merchants 206, the issuers 210, the interchange network 126, etc., to utilize data collected during enrollment and/or collected relating to processing the transactions, subsequently for one or more of the purposes described herein.

As shown in FIG. 2, the interchange network 126 includes the payment application server 122, which is, for example, and without limitation, a server, a network of multiple computing devices, a virtual computing device, or the like. In addition, in some embodiments, the payment card network system 200 may also include one or more merchant or client sub-systems 130 (also referred to as client systems) coupled in communication to the payment application server 122. The client systems 130 are computers including, for example, a web browser and a memory device, such that the payment application server 122 is accessible to the client systems 130 using, for example, the Internet. The client systems 130 are interconnected to the Internet through one or more interfaces including a network, such as a local area network (LAN) or a wide area network (WAN), dial-in-connections, cable modems, and special high-speed ISDN lines. The client systems 130 can be any device capable of interconnecting to the Internet including, for example, a web-based smartphone, a personal digital assistant (PDA), or any other web-based connectable equipment.

As described above, the payment card network system 200 includes one or more cardholder computer systems 104 that are connected to the payment application server 122, and in some embodiments, may be connected to the client systems 130. The cardholder computer systems 104 are interconnected to the Internet through one or more interfaces including a network, such as a local area network (LAN) or a wide area network (WAN), dial-in-connections, cable modems, wireless modems, and special high-speed ISDN lines. The cardholder computer systems 104 can be any computing device capable of interconnecting to the Internet and including an input device capable of reading or storing information from a user's financial transaction card, including the digital wallet data 406.

Furthermore, as described above, the payment card network system 200 includes at least one cardholder mobile computing device 106 (e.g., a smartphone or other computing device used by the consumer to complete transactions), which is configured to communicate with the payment application server 122. In one embodiment, the cardholder mobile computing device 106 is associated with or controlled by a consumer making a purchase using a transaction card account and the payment card network system 200. In the example embodiment, the cardholder mobile computing device 106 is configured to communicate with the payment application server 122 to transmit, for example, and without limitation, the cardholder's account access credentials and/ or transaction data to the payment application server 122. The cardholder mobile computing device 106 is configured to communicate with the payment application server 122 using various outputs including, for example, radio frequency communication, near field communication (NFC), network-based communication, and the like.

The payment application server 122 is connected to the database 124. In one embodiment, the database 124 is stored on the payment application server 122 and can be accessed by users at one of the client systems 130 by logging onto the payment application server 122 through one of the client systems 130. The database 124 may store transaction data generated as part of sales activities conducted over the bankcard network including data relating to merchants, account holders or customers, and purchases. The database 124 may also store account data including at least one of a user name, a user address, an account number, and other account identifiers. The database 124 may also store merchant data including a merchant identifier that identifies each merchant registered to use the payment account card network, and instructions for settling transactions including merchant bank account information. The database 124 may also store primary account numbers (PANs) or bank account numbers for various parties including merchants and customers, along with payment verification identifiers and other data necessary to implement the system and processes described herein.

Figure 3:
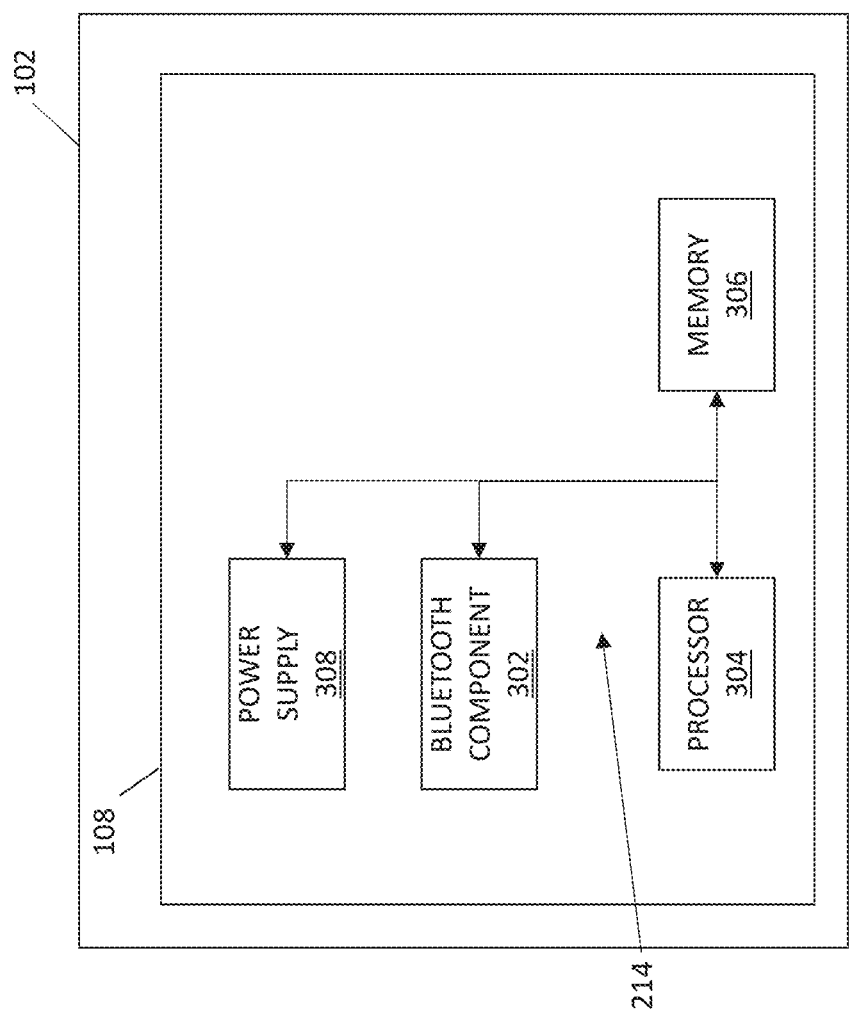
FIG. 3 is a schematic view of a controller contained in the hearing device shown in FIG. 1.

FIG. 3 is a schematic view of the controller 108 contained in the hearing device 102. In the example embodiment, the controller 108 is a small form factor computing device configured to wirelessly communicate with a plurality of devices using wireless technologies, such as Bluetooth communications.

In the example embodiment, the controller 108 includes an integrated Bluetooth component 302 (e.g., implementing capabilities in accordance to the Bluetooth Alliance standards, including Bluetooth classic and Bluetooth Low Energy (BLE)) (broadly, wireless communication device). In addition, the controller 108 includes a processor 304, and a memory device 306. Moreover, the controller 108 includes an internal power supply 308 (e.g., a battery or other self-contained power source) for providing power to the various electronic components.

The processor 304 includes one or more processing units (e.g., in a multi-core configuration) for executing computer readable instructions. The instructions may be executed within a variety of different operating systems (OS) on the controller 108, such as UNIX, LINUX, proprietary systems, etc. More specifically, the instructions may cause various data manipulations on data in the memory device 306 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

In the example embodiment, the processor 304 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

The controller 108 includes circuitry 214 configured to communicate with the cardholder computer systems 104 and the cardholder mobile computing devices 106 (shown in FIG. 1). The circuitry 214 may include, for example, leads, connectors, Bluetooth-enabled circuitry, and the like. The hearing device 102 is configured to enclose and at least partially seal the circuitry 214, which is susceptible to degradation from the ambient environment. In one suitable embodiment, the circuitry 214 is hermetically sealed in the hearing device 102. For example, the circuitry 214 may be completely and permanently encased within the hearing device 102. In other words, the hearing device 102 and the circuitry 214 are intended to remain as a single, inseparable unit throughout the life of the controller 108. It is understood that the hearing device 102 may be formed separately from the circuitry 214 and that the circuitry 214 can be placed into and sealed within the hearing device 102 in a separate operation. In another suitable embodiment, the circuitry 214 can be selectively, sealingly enclosed within the hearing device 102, where the hearing device 102 includes a closure element (e.g., a lid, cover, etc.) attached to or formed as part of a body of the hearing device 102.

In some embodiments, the controller 108 may be connected to one or more peripheral devices, such as the cardholder computer systems 104 and/or the cardholder mobile computing devices 106. That is, the controller 108 may intercommunicate various data with the cardholder computer systems 104 and the cardholder mobile computing devices 106, including for example, audio data signals. For example, the controller 108 may communicate with the cardholder mobile computing device 106 through the Bluetooth component 302, as described above.

Figure 4:
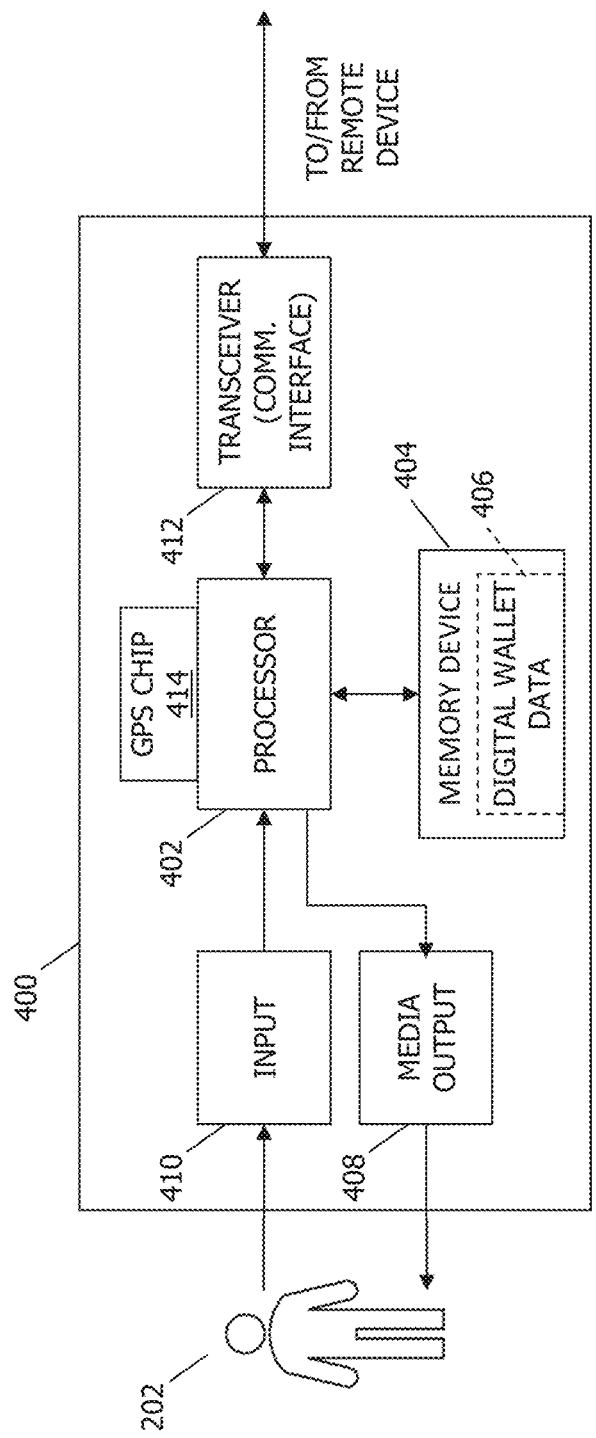
FIG. 4 is a block diagram illustrating an example of a user computing system, such as a cardholder mobile computing device shown in FIG. 1.

FIG. 4 is an example configuration of a user system 400 operated by a user, such as the cardholder 202 (shown in FIG. 2). In some embodiments, the user system 400 is the cardholder computer system 104 (shown in FIG. 1), the cardholder mobile computing device 106 (shown in FIG. 1), and/or a client system 130 (shown in FIG. 2).

In the example embodiment, the user system 400 includes one or more processors 402 for executing instructions. In some embodiments, executable instructions are stored in a memory device 404. The processor 402 may include one or more processing units arranged, for example, in a multi-core configuration. The memory device 404 is any device allowing information such as the digital wallet data 406, executable instructions, and/or written works to be stored and retrieved. The memory device 404 includes one or more computer readable media.

In one example embodiment, the processor 402 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

A location of the user system 400 can be obtained through conventional methods, such as a location service (e.g., global positioning system (GPS) service) in the user system 400, "ping" data that includes geotemporal data, from cell location register information held by a telecommunications provider to which the user system 400 is connected, and the like. For example, in one suitable embodiment, a GPS chip 414 can be part of or separate from the processor 402 to enable the location of the user system 400 to be determined.

The user system 400 also includes at least one media output component 408 for presenting information to the cardholder 202. The media output component 408 is any component capable of conveying information to the cardholder 202. In some embodiments, the media output component 408 includes an output adapter such as a video adapter and/or an audio adapter. The output adapter is operatively coupled to the processor 402 and operatively connectable to an output device such as a display device, a liquid crystal display (LCD), organic light emitting diode (OLED) display, or "electronic ink" display, or an audio output device, such as an integrated speaker and the like.

In one example embodiment, the media output component 408 includes an integrated display, which can include, for example, and without limitation, a liquid crystal display (LCD), an organic light emitting diode (OLED) display, or an "electronic ink" display. In some embodiments, the integrated display may optionally include a touch controller for support of touch capability. In such embodiments, a cardholder mobile computing device 106 may detect a person's presence by detecting that the person has touched the integrated display on the cardholder mobile computing device 106.

In some embodiments, the user system 400 includes an input device 410 for receiving input from the cardholder 202. The input device 410 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both an output device of the media output component 408 and the input device 410, as described above. The user system 400 may also include a transceiver 412 (broadly, a communication interface), which is communicatively connectable to the network 110 (shown in FIG. 1) and/or a remote device such as the merchant client system 130 (shown in FIG. 2). The transceiver 412 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 404 are, for example, computer readable instructions for providing a user interface to the cardholder 202 via the media output component 408 and, optionally, receiving and processing input from the input device 410. A user interface may include, among other possibilities, a web browser and/or the payment application 120 (shown in FIG. 1). Web browsers enable users, such as the cardholder 202, to display and interact with media and other information typically embedded on a web page or a website from payment application server 122. The payment application 120 allows the cardholder 202 to interact with the payment application server 122 to perform electronic transactions.

Figure 5:
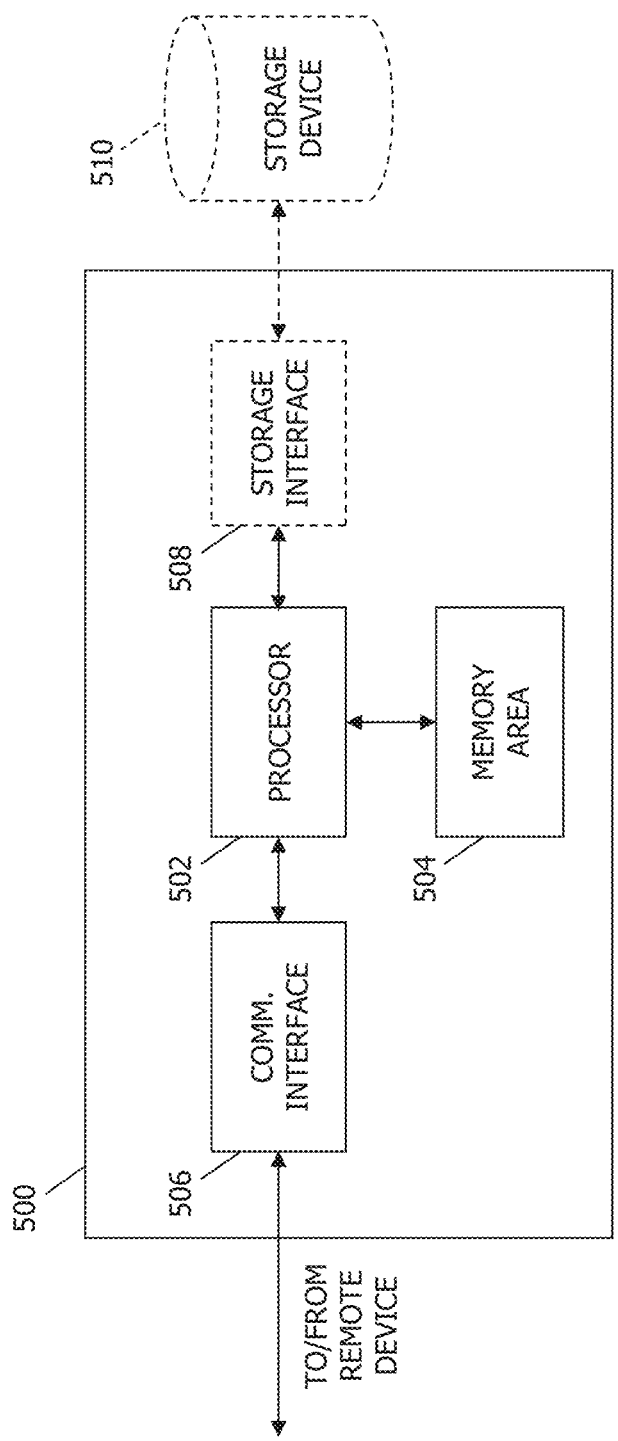
FIG. 5 is an example configuration of a server system, such as a payment application server shown in FIG. 1.

FIG. 5 is an example configuration of a server system 500, such as the payment application server 122 (shown in FIG. 1). In some embodiments, the server system 500 is substantially like the payment application server 122. In the example embodiment, the server system 500 includes a processor 502 for executing instructions. The instructions may be stored in a memory area 504, for example. The processor 502 includes one or more processing units (e.g., in a multi-core configuration) for executing the instructions. The instructions may be executed within a variety of different operating systems on the server system 500, such as UNIX, LINUX, Microsoft Windows®, etc. More specifically, the instructions may cause various data manipulations on data stored in a storage device 510 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

In one example embodiment, the processor 502 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

The processor 502 is operatively coupled to a communication interface 506 such that the server system 500 can communicate with a remote device such as a user system 400 or another server system 500. For example, the communication interface 506 may receive communications from the cardholder mobile computing device 106 and/or the cardholder computer system 104 via the Internet, as illustrated in FIG. 1.

The processor 502 is operatively coupled to the storage device 510. The storage device 510 is any computer-operated hardware suitable for storing and/or retrieving data. In some embodiments, the storage device 510 is integrated in the server system 500 and is like the database 124 (shown in FIG. 1). In other embodiments, the storage device 510 is external to the server system 500. For example, the server system 500 may include one or more hard disk drives as the storage device 510. In other embodiments, the storage device 510 is external to the server system 500 and may be accessed by a plurality of server systems 500. For example, the storage device 510 may include multiple storage units such as hard disks or solid-state disks in a redundant array of inexpensive disks (RAID) configuration. The storage device 510 may include a storage area network (SAN) and/or a network attached storage (NAS) system.

In some embodiments, the processor 502 is operatively coupled to the storage device 510 via a storage interface 508. The storage interface 508 is any component capable of providing the processor 502 with access to the storage device 510. The storage interface 508 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 502 with access to the storage device 510.

The memory area 504 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAIVI). The above memory types are exemplary only and are thus not limiting as to the types of memory usable for storage of a computer program.

Figure 6:
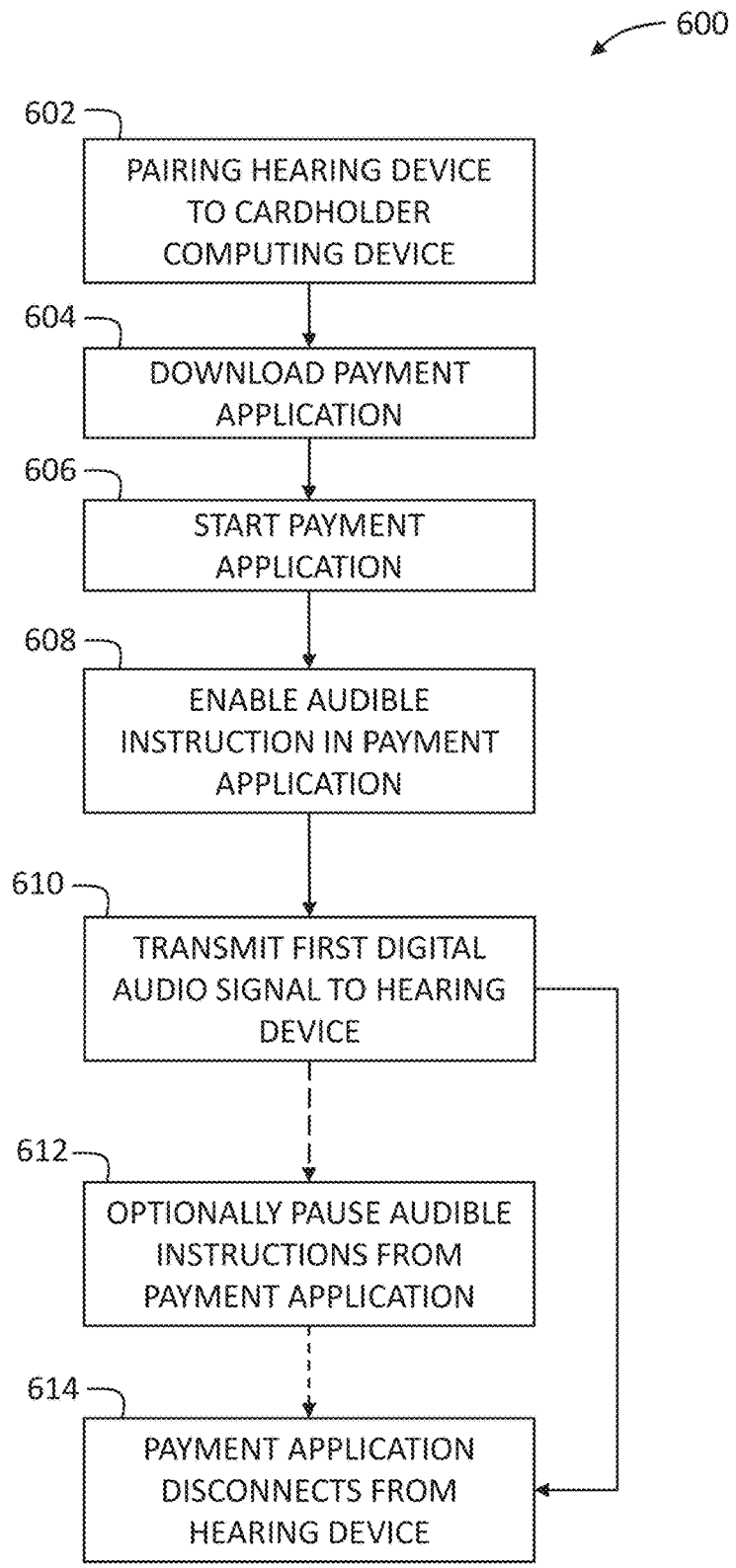
FIG. 6 is a flowchart illustrating an exemplary computer-implemented method for transmitting digital audio signals to the hearing device shown in FIG. 1, for performing a transaction in accordance with one embodiment of the present disclosure.

FIG. 6 is a flowchart illustrating an exemplary computer-implemented method 600 for transmitting digital audio signals to a hearing device, such as the hearing device 102 (shown in FIG. 1), for performing a transaction in accordance with one embodiment of the present disclosure. The operations described herein may be performed in the order shown in FIG. 6 or, unless stated otherwise or as appeared to those ordinarily skilled in the art, may be performed in a different order. Furthermore, some operations may be performed concurrently as opposed to sequentially. In addition, according to certain aspects of the present invention, some operations may be optional.

The computer-implemented method 600 is described below, for ease of reference, as being executed by exemplary devices and components introduced with the embodiments illustrated in FIGS. 1-5. In one embodiment, the method 600 may be implemented by the cardholder computer system 104 and/or the cardholder mobile computing device 106 and the hearing device 102 (each shown in FIG. 1). In the exemplary embodiment, the method 600 relates to the transmission of audible instructions for performing a transaction using the payment application 120, wherein the instructions are from the cardholder computer system 104 and/or the cardholder mobile computing device 106 to the hearing device 102. While operations within the method 600 are described below regarding the cardholder computer system 104 and/or the cardholder mobile computing device 106, the method 600 may be implemented using the hearing device 102 in conjunction with the cardholder computer system 104 and/or the cardholder mobile computing device 106 as well as other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 602, the hearing device 102 is paired with the cardholder computer system 104 and/or the cardholder mobile computing device 106. To facilitate pairing the devices together, the cardholder, such as the cardholder 202 (shown in FIG. 2) enables the Bluetooth feature on the cardholder computer system 104 and/or the cardholder mobile computing device 106. In addition, the cardholder 202 enables the Bluetooth feature on the hearing device 102. The cardholder 202 then activates the pairing function of the hearing device 102, for example, by pressing a pairing switch (not shown) on the device. After activating the pairing function, the hearing device 102 detects Bluetooth devices that are within range, such as the cardholder computer system 104 and/or the cardholder mobile computing device 106. When the cardholder computer system 104 and/or the cardholder mobile computing 106 device is detected, the hearing device 102 transmits a unique identifier to the detected device to establish a connection. In some embodiments, the cardholder 202 receives the unique identifier in a visual message and must enter the unique identifier into the cardholder computer system 104 and/or the cardholder mobile computing device 106 to establish the connection. The Bluetooth connection may subsequently be operational to stream digital audio signals from the cardholder computer system 104 and/or the cardholder mobile computing device 106 to the hearing device 102.

At operation 604, in the example embodiment, the cardholder 202 (shown in FIG. 2) downloads the payment application 120 (shown in FIG. 1). For example, the cardholder 202 may connect to a payment application server, such as the payment application server 122 (shown in FIG. 1) that is part of the interchange network 126 described above, which may instruct the cardholder 202 to download the payment application 120 to the cardholder computer system 104 and/or the cardholder mobile computing device 106. Alternatively, the cardholder 202 may download the payment application 120 from a mobile application web store that is compatible with the cardholder computer system 104 and/or the cardholder mobile computing device 106. When the cardholder 202 uses the payment application 120, a direct link is established via a wireless connection, for example, via a Wi-Fi connection to the payment application server 122 via the communications network 110 (shown in FIG. 1).

The cardholder computer system 104 and/or the cardholder mobile computing device 106, such as a web-based smartphone, is configured to execute for display the payment application 120. In some embodiments, the payment application 120 may be stored in a cloud-based interface, which may include cloud storage capability as well as any cloud-based API that facilitates communication between the cardholder computer system 104 and/or the cardholder mobile computing device 106 and the payment application server 122. The payment application 120 facilitates transmitting and receiving payment card data between the cardholder mobile computing device 106 and the payment application server 122 for performing payment transactions.

At operation 606, the cardholder 202 executes or starts the payment application 120 (shown in FIG. 1) on the cardholder computer system 104 and/or the cardholder mobile computing device 106. In the exemplary embodiment, the payment application 120 is configured to play pre-recorded audible instructions and messages to facilitate easy and precise execution of a payment transaction. The pre-recorded audible instructions may be stored locally on the cardholder computer system 104 and/or the cardholder mobile computing device 106, for example, in the memory device 404 (shown in FIG. 4). Alternatively, the pre-recorded audible instructions may be stored in the database 124 (shown in FIG. 1) and transmitted to payment application 120 in real-time as required. The pre-recorded audible instructions may be stored as digital audio signals, which are transmitted to the hearing device 102 via the wireless connections 112 and/or 114.

At operation 608, after the payment application 120 is started, the cardholder may choose to enable the audible instructions. For example, in one embodiment, the payment application 120 may include a settings or options menu that has an option for enabling/disabling the audible instructions. When the audible instructions are enabled in the settings or options menu, the payment application 120 automatically transmits the audible instructions as digital audio signals to the hearing device 102 via the wireless connections 112 and/or 114 during use of the payment application 120. When the audible instructions are disabled in the settings or options menu, the payment application 120 does not transmit the audible instructions to the hearing device 102, but rather may include one or more visual prompts on the cardholder computer system 104 and/or the cardholder mobile computing device 106 to perform the payment transaction.

In another embodiment, the payment application 120 may include an Audible Instructions icon that may be triggered (e.g., pressed, swiped, etc.) to start, stop, and/or pause the audible instructions in real-time. For example, if the cardholder 202 determines that the ambient environment does not require the use of the audible instruction (e.g., the noise level is low), the cardholder may choose to not enable the audible instructions for a particular transaction. If the noise level were to increase such that the cardholder 202 desired the assistance of the audible instructions, he or she could trigger the Audible Instructions icon to enable use of the audible instructions as the transaction process continues.

In some embodiments, the digital audio signals may include hearing device control data instructing the hearing device to disable a microphone of the hearing device 102 to facilitate eliminating background noise so the audible instruction may be clearly heard by the cardholder 202. In some embodiments, the hearing device control data may instruct the hearing device 102 to attenuate the sound received by the microphone to facilitate increasing the clarity of the audible instructions but allowing the cardholder 202 to still hear some background noise. This may enable the cardholder to maintain a sense of happenings in the cardholder's surroundings while still clearly hearing the audible instructions.

At operation 610, the payment application 120 transmits a first digital audio signal to the cardholder computer system 104 and/or the cardholder mobile computing device 106. The first digital audio signal may include an initial audible instruction to the cardholder 202 instructing the cardholder on a first step for creating a digital wallet account (e.g., a Masterpass account) or for performing a payment transaction using the payment application 120 (i.e., the digital wallet). For example, and without limitation, the audible instructions may step the cardholder 202 through an account generation process, instructing the cardholder 202 to input cardholder information such as name, address, login credentials, payment account information, etc. For performing a transaction, the audible instructions may instruct the cardholder 202 to select a payment account, for example, if two or more payments accounts are associated with the digital wallet or step the cardholder through the process of completing the transaction at the merchant point-of-sale (POS) device (not shown). The cardholder 202 may use the payment application 120 to transmit a payment credential (e.g., the digital wallet data 306) to the merchant POS device to perform a payment transaction. The audible instructions may instruct the cardholder to place the cardholder mobile computing device 106 near the POS device. When the POS device and the cardholder mobile computing device 106 make a connection, the audible instructions may indicate such to the cardholder 202. If there is an error or if a connection to the POS device is not sensed in a predetermined period, the payment application 120 may transmit an instruction to re-tap the cardholder mobile computing device 106 to the POS device. After receiving the payment credential, the POS device initiates the payment transaction. After receiving a payment authorization response message, the POS device displays a successful purchase message to the cardholder 202 and an audible instruction may indicate that the transaction was successful. If the transaction cannot be completed, the audible instructions may notify the user of the incomplete transaction and provide one or more reasons, which may typically be provided by the interchange network to the POS device. It is noted that the above-described instructions are merely examples and that many different instructions may be pre-recorded and stored for playback through the payment application 120.

At operation 612, the cardholder 202 may optionally trigger the Audible Instructions icon to pause the audible instructions and, optionally, the operation of the payment application 120. For example, and without limitation, the cardholder 202 may determine that the audible instructions are unnecessary and choose to disable the instructions during a transaction in order to maintain the normal operation of the hearing device 102. For example, triggering the Audible Instructions icon may present to the user a notification that the instructions will be disabled until reenabled by the cardholder while continuing the payment transaction.

In another embodiment, the cardholder 202 may wish to pause the entire transaction for an indeterminate period. For example, and without limitation, the cardholder 202 may be interrupted by a sales clerk of the merchant or may become otherwise distracted while using the payment application 120. The Audible Instructions icon may be triggered to interrupt the process flow of the payment application 120, pausing the process until the cardholder 202 can subsequently focus his or her attention on the payment application. After triggering the Audible Instructions icon, the payment application 120 may present to the user an audible notification that the audible instructions will be disabled until reenabled by the cardholder and subsequently present an audible option to pause the transaction process. As such, the Audible Instructions icon may perform different actions at different points of use of the payment application 120. When the payment application 120 is started, the Audible Instructions icon may enable or disable the audible instructions function and during a transaction or account setup process, the Audible Instructions icon may be used to pause the process for an indeterminate period.

At operation 614, the payment application 120 may disconnect from the wireless connections 112 and/or 114 after completion of a transaction to facilitate returning normal hearing assistance operations to the hearing device 102. For example, and without limitation, in one embodiment, the payment application 120 may automatically disconnect from the wireless connections 112 and/or 114 at the termination of a payment transaction. The cardholder 202 may then activate the audible instructions when beginning a new transaction. In another embodiment, the payment application 120 may transmit an instruction to the hearing device 102 requesting that the cardholder 202 disconnect from the wireless connections 112 and/or 114 by triggering the Audible Instructions icon and/or by closing the payment application 120. After a predetermined period following the termination request, the payment application 120 may automatically disconnect from the wireless connections 112 and/or 114.

Figure 7:
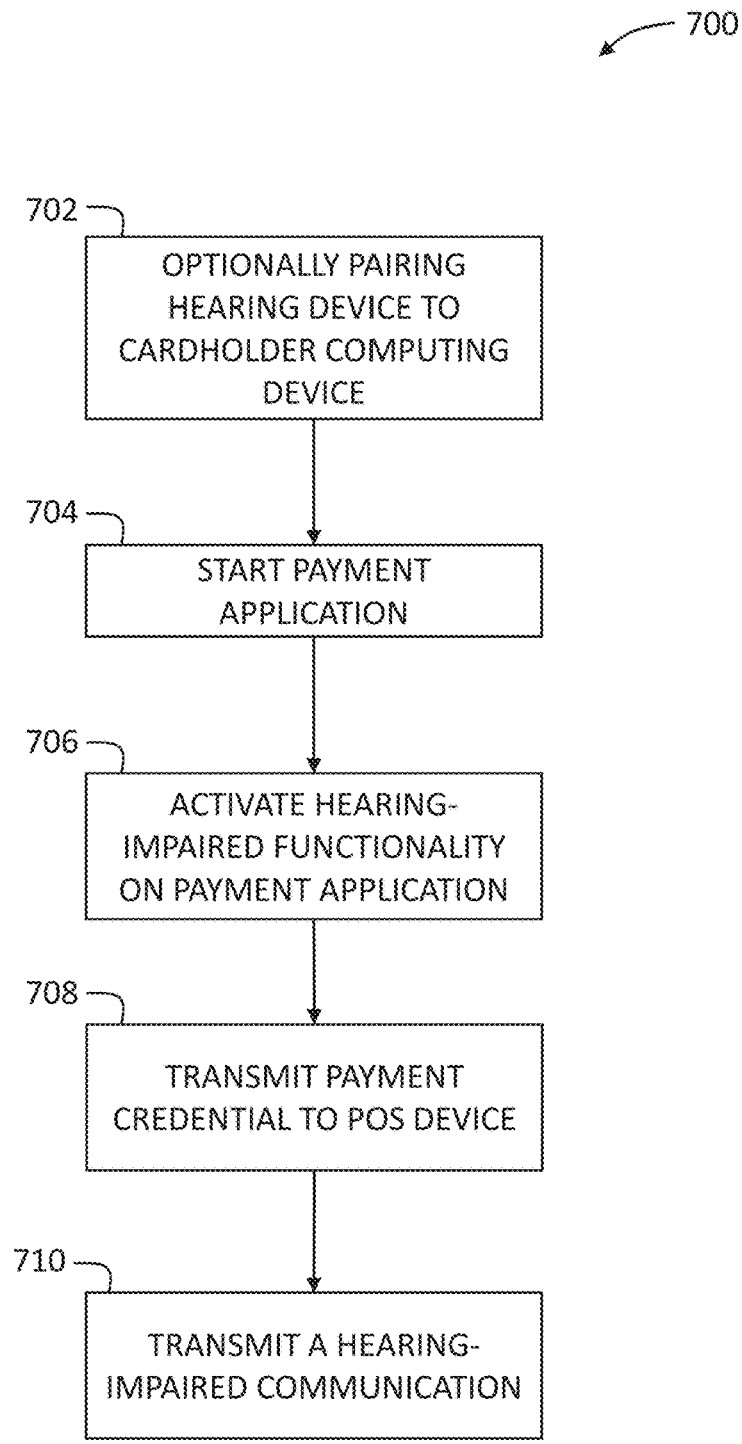
FIG. 7 is a flowchart illustrating an exemplary computer-implemented method for carrying out a hearing-impaired transaction in accordance with one embodiment of the present disclosure.

FIG. 7 is a flowchart illustrating an exemplary computer-implemented method 700 for performing a hearing-impaired transaction in accordance with one embodiment of the present disclosure. The computer-implemented method 700 may or may not involve a hearing device, such as the hearing device 102 (shown in FIG. 1). The operations described herein may be performed in the order shown in FIG. 7 or, unless stated otherwise or as appeared to those ordinarily skilled in the art, may be performed in a different order. Furthermore, some operations may be performed concurrently as opposed to sequentially. In addition, according to certain aspects of the present invention, some operations may be optional.

The computer-implemented method 700 is described below, for ease of reference, as being executed by exemplary devices and components introduced with the embodiments illustrated in FIGS. 1-5. In one embodiment, the method 700 may be implemented by the cardholder computer system 104 and/or the cardholder mobile computing device 106 and an optional hearing device 102 (each shown in FIG. 1). In the exemplary embodiment, the method 700 relates to the transmission of instructions for performing a transaction using the payment application 120, wherein the payment application 120 has a hearing-impaired functionality. While operations within the method 700 are described below regarding the cardholder computer system 104 and/or the cardholder mobile computing device 106, the method 700 may be implemented using the cardholder computer system 104 and/or the cardholder mobile computing device 106 as well as other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 702, a hearing device 102 may be optionally paired with the cardholder computer system 104 and/or the cardholder mobile computing device 106. To facilitate pairing the devices together, the cardholder, such as the cardholder 202 (shown in FIG. 2) enables the Bluetooth feature on the cardholder computer system 104 and/or the cardholder mobile computing device 106. In addition, the cardholder 202 enables the Bluetooth feature on the hearing device 102. The cardholder 202 then activates the pairing function of the hearing device 102, for example, by pressing a pairing switch (not shown) on the device. After activating the pairing function, the hearing device 102 detects Bluetooth devices that are within range, such as the cardholder computer system 104 and/or the cardholder mobile computing device 106. When the cardholder computer system 104 and/or the cardholder mobile computing 106 device is detected, the hearing device 102 transmits a unique identifier to the detected device to establish a connection. In some embodiments, the cardholder 202 receives the unique identifier in a visual message and must enter the unique identifier into the cardholder computer system 104 and/or the cardholder mobile computing device 106 to establish the connection. The Bluetooth connection may subsequently be operational to stream digital audio signals from the cardholder computer system 104 and/or the cardholder mobile computing device 106 to the hearing device 102.

At operation 704, the cardholder 202 executes or starts the payment application 120 having a hearing-impaired functionality (shown in FIG. 1) on the cardholder computer system 104 and/or the cardholder mobile computing device 106. The payment application 120 facilitates transmitting and receiving payment card data, payment credentials, and hearing-impaired communications between the cardholder mobile computing device 106 and the payment application server 122 for performing payment transactions.

In certain embodiments, when the hearing-impaired functionality of the payment application 120 is enabled, the payment application 120 may comprise a chatbot functionality that can facilitate chatbot-based communications between the payment application 120 and the POS devices (not depicted). The chatbot functionality allows the hearing-impaired cardholder 202 to conduct a conversation with the POS device via auditory or textual methods (e.g., talk-to-text and/or text messages). More particularly, the chatbot functionality may stimulate a conversational experience or chat session between the hearing-impaired cardholder 202 (via the payment application 120) and the POS device. In such embodiments, the hearing-impaired cardholder 202 can submit a request over the payment application 120 (via auditory or textual methods) and the chatbot will attempt to interpret the request and then provide a relevant answer. For example, if the hearing-impaired cardholder 202 requests help from a sales clerk using the payment application 120, the chatbot may provide locations where such a sales clerk may be found. Generally, the answer provided by the chatbot may be a simple answer to a known question that may be relevant to the commercial transactions handled by POS device. If the answer to the cardholder's question is unknown, the chatbot may simply offer a list of Frequently Asked Questions (FAQ) and invite the cardholder to select one over the payment application 120.

In certain embodiments, the cardholder computer system 104, the cardholder mobile computing device 106, and/or the POS device may comprise a chatbot functionality, such as a data-driven and predictive chatbot functionality, that can facilitate an interactive dialog between the cardholder 202 and POS device. Furthermore, in certain embodiments, such chatbots can apply predictive intelligence and analytics to enable a personalized shopping experience between the cardholder and POS device. Chatbots may also be referred to as "virtual assistants" or "digital assistants."

The chatbot session may be carried out by the cardholder computer system 104, the cardholder mobile computing device 106, and/or the POS device. More particularly, in certain embodiments, the chatbot may operate on the cardholder computer system 104, the cardholder mobile computing device 106, and/or the POS device after the hearing-impaired functionality of the payment application 120 is enabled.

Generally, chatbot programs are designed to simulate intelligent conversation between the human cardholder and the POS device via auditory or textual methods. The chatbot functionality of the payment application 120 may provide a chat session via processor 402 between the hearing-impaired cardholder 202 and the POS device, thereby allowing a real-time interactive dialog to occur between the cardholder 202 and the POS device. Consequently, this can allow a hearing-impaired cardholder 202 to effectively communicate with a POS device by using chatbot-facilitated transmissions, which are user-friendly to the hearing-impaired cardholder 202.

In certain embodiments, the payment application 120 may connect with the POS device, create a chat session with the POS device over the payment application server 122 via the chatbot functionality, and then facilitate interactive communications in real-time between the hearing-impaired cardholder 202 and the POS device. During these interactive communications, the POS device may submit questions to the hearing-impaired cardholder 202, such as those regarding their shopping needs, and the cardholder 202 may provide their answers using the payment application 120 via the input device 410.

Generally, in various embodiments, the chat session involving the chatbot functionality may involve: (1) the cardholder 202 submitting a request (e.g., questions or inquiries regarding commercial transactions) to the POS device via the payment application 120; (2) the POS device analyzing the cardholder's request; and (3) the POS device creating and submitting a list of answers and possible follow up questions in response to the cardholder's specific requests (e.g., request specific shop items or assistance), which will be displayed in the payment application 120 on the cardholder computer system 104 or the cardholder mobile computing device 106. The cardholder may submit this request to the POS device via text messages and/or a "talk-to-text" functionality enabled by the payment application 120.

In certain embodiments, when the hearing-impaired functionality of the payment application 120 is enabled, the payment application 120 may be configured to play pre-recorded audible instructions and messages to facilitate easy and precise execution of a payment or commercial transaction. The pre-recorded audible instructions may be stored locally on the cardholder computer system 104 and/or the cardholder mobile computing device 106, for example, in the memory device 404 (shown in FIG. 4). Alternatively, the pre-recorded audible instructions may be stored in the database 124 (shown in FIG. 1) and transmitted to payment application 120 in real-time as required. The pre-recorded audible instructions may be stored as digital audio signals, which are transmitted to a hearing device 102 via the wireless connections 112 and/or 114.

In certain embodiments, when the hearing-impaired functionality of the payment application 120 is enabled, the payment application 120 may be configured to provide readable text instructions and messages to the hearing-impaired individual to thereby facilitate easy and precise execution of a payment and commercial transaction. For example, the payment application 120 may convert all transactional information regarding the payment transaction via processor 402 into readable text form and provide this text for the cardholder's review. The readable text can include, for example, receipts and other information associated with the payment transaction. This readable text may be stored locally on the cardholder computer system 104 and/or the cardholder mobile computing device 106, for example, in the memory device 404 (shown in FIG. 4). Alternatively, the readable text instructions may be stored in the database 124 (shown in FIG. 1) and transmitted to payment application 120 in real-time as required. The readable text may be displayed in real-time on the media output 408. The payment application 120 may also allow the hearing-impaired cardholder 202 to communicate with the merchant POS device using the input device 410. For example, the hearing-impaired cardholder 202 may convey specific text message requests (e.g., request specific shop items or assistance) using the input device 410 to the merchant POS device, which can then be conveyed to a sales clerk at the retail setting.

At operation 706, the hearing-impaired functionality of the payment application 120 may be activated. For example, the payment application 120 may include a settings or options menu that has an option for enabling/disabling the hearing-impaired functionality of the payment application 120. When the hearing-impaired functionality is enabled in the settings or options menu, the payment application 120 automatically carries out one or more of the actions described above, including enabling chatbot communications with a POS device during use of the payment application 120, transmitting and converting all transactional information into readable text during use of the payment application 120, and/or transmitting the audible instructions as digital audio signals to the hearing device 102 via the wireless connections 112 and/or 114 during use of the payment application 120. In certain embodiments, when the hearing-impaired functionality is disabled in the settings or options menu, the payment application 120 does not carry out any of the hearing-impaired functionalities described herein. In alternative embodiments, when the hearing-impaired functionality is disabled in the settings or options menu, the payment application 120 may still carry out the chatbot functionality described herein, but does not carry out any of the other hearing-impaired functionalities described herein.

In various embodiments, the payment application 120 may include a hearing-impaired functionality icon that may be triggered (e.g., pressed, swiped, etc.) to start, stop, and/or pause the hearing-impaired functionality in real-time. For example, if the cardholder 202 determines that the ambient environment does not require the use of the hearing-impaired functionality, the cardholder 202 may choose to not enable the hearing-impaired functionality for a particular transaction.

When activating the hearing-impaired functionality in the payment application 120, the hearing-impaired functionality of the payment application 120 may allow the cardholder 202 to select amongst a designated listing of disabilities (e.g., hearing-impaired, visually-impaired, etc.) so that the payment application 120 may institute specific actions based on the selected disability. For example, if the cardholder selects "hearing-impaired," then the payment application 120 may provide all communications between the payment application 120 and the merchant 206 in the form of text messages, chatbot-based communications, and/or as auditory messages provided from the media output 408 of the cardholder's device. Furthermore, the cardholder 202 may select what specific actions that the payment application 120 can carry out based on the cardholder's selected disability, such as whether to provide all communications in text form and/or provide all communications in auditory form. For instance, the cardholder 202 may instruct the payment application 120 to provide all communications between the payment application 120 and the merchant 206 in the form of text messages and/or chatbot-facilitated communications, but not in the form of auditory messages. The above selections may changed in real-time by selecting (e.g., pressing, swiping, voice-activated, etc.) the corresponding icon associated with these specific disability functions on the payment application 120. Thus, in such embodiments, the cardholder 202 could "swipe" and activate the icon selecting enlarged text messages, but not swipe the icon associated with auditory functionality.

At operation 708, the payment application 120 initially transmits a payment credential to a POS device via the payment application server 122 to thereby initiate the commercial transaction. The payment credential may initiate communication between the payment application 120 and the POS device and may include instructions for performing a payment transaction using the payment application 120 (i.e., the digital wallet). For example, and without limitation, the payment credential may communicate the cardholder's impairment (e.g., hearing-impaired) and additional cardholder information, such as name, address, login credentials, payment account information, etc., to the POS device.

When performing a transaction, the payment application 120 may instruct the cardholder 202 to select a payment account, for example, if two or more payments accounts are associated with the digital wallet or step the cardholder through the process of completing the transaction at the POS device. The cardholder 202 may use the payment application 120 to transmit a payment credential (e.g., the digital wallet data 306) to the merchant POS device to perform a payment transaction. The payment application 120 may instruct the cardholder 202 to place the cardholder mobile computing device 106 near the POS device. When the POS device and the cardholder mobile computing device 106 make a connection, the payment application 120 may indicate such to the cardholder 202. If there is an error or if a connection to the POS device is not sensed in a predetermined period, the payment application 120 may transmit an instruction to re-tap the cardholder mobile computing device 106 to the POS device. After receiving the payment credential, the POS device initiates the payment transaction. After receiving a payment authorization response message, the POS device may display a successful purchase message to the cardholder 202 and a message on the payment application 120 may indicate that the transaction was successful. If the transaction cannot be completed, the payment application 120 may notify the user of the incomplete transaction and provide one or more reasons, which may typically be provided by the interchange network to the POS device.

At operation 710, a hearing-impaired communication may be transmitted between the payment application 120 and the merchant POS device. This hearing-impaired communication may be transmitted over the network 110 via the processor 402. The hearing-impaired communication may include any of the hearing-impaired communications provided by the payment application 120. For example, the hearing-impaired communication may include a chatbot-facilitated chat session between the cardholder 202 and the merchant POS device, transactional information that has been converted into readable text messages for the cardholder 202, and/or transmitting an audible instruction to a hearing device 102 of the cardholder 202. These hearing-impaired communications may adequately describe the ongoing commercial transaction, thereby allowing a hearing-impaired cardholder to carry out and finish a payment transaction at any accommodating venue.

The payment application 120 may disconnect from the wireless connections 112 and/or 114 after completion of a transaction. For example, and without limitation, in one embodiment, the payment application 120 may automatically disconnect from the wireless connections 112 and/or 114 at the termination of a payment transaction. After a predetermined period following the termination request, the payment application 120 may automatically disconnect from the wireless connections 112 and/or 114.

ADDITIONAL CONSIDERATIONS

Any actions, functions, operations, and the like recited herein may be performed in the order shown in the figures and/or described above or, unless stated otherwise or as apparent to those ordinarily skilled in the art, may be performed in a different order. Furthermore, according to certain aspects of the present invention, some operations may be performed concurrently as opposed to sequentially. Although the methods are described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon and for instructing one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processor," "processing element," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are example only and are thus not limiting as to the types of memory usable for storage of a computer program.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, Wi-Fi, IEEE 802 including Ethernet, WiMAX, and/or others), including supporting various local area networks (LANs), personal area networks (PAN), or short-range communications protocols.

The term "communication component," "communication interface," and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory area," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed, and substitutions made herein without departing from the scope of the invention as recited in the claims.

What is claimed is:

1. A computer-implemented method performed on a cardholder mobile smartphone, said computer-implemented method comprising the steps of:
   starting a digital wallet application on the cardholder mobile smartphone, wherein the digital wallet application comprises a hearing-impaired functionality and an input icon for activating the hearing-impaired functionality, the input icon presented for display on a user interface of the cardholder mobile smartphone;
   receiving input from the input icon upon the input icon being triggered;
   in response to receiving the input, activating the hearing-impaired functionality on the digital wallet application, the hearing-impaired functionality including a data-driven and predictive chatbot functionality;
   upon activating the hearing-impaired functionality, presenting one or more instructions via the cardholder mobile smartphone;
   coupling the cardholder mobile smartphone in communication to a point-of-sale device;
   upon the coupling, creating a chat session with the point-of-sale device via the data-driven and predictive chatbot functionality, the chat session allowing real-time interactive communication between the cardholder mobile smartphone and the point-of-sale device;
   upon creating the chat session, receiving a hearing-impaired communication from the point-of-sale device;
   pairing the cardholder smartphone to an implantable hearing device of a cardholder via a wireless communication protocol;
   upon pairing the cardholder smartphone to a hearing device of a card holder, transmitting a digital audio signal to the implantable hearing device via the wireless communication protocol, the digital audio signal comprising hearing device control data; and
   disabling a microphone of the implantable hearing device via the hearing device control data.

2. The computer-implemented method of claim 1, wherein the hearing-impaired communication comprises a chatbot-facilitated communication between the digital wallet application and the point-of-sale device.

3. The computer-implemented method of claim 1, wherein the hearing-impaired functionality comprises converting all transactional information to a cardholder into readable text form.

4. The computer-implemented method of claim 3, wherein the step of receiving the hearing-impaired communication includes the step of receiving one or more text messages from the point-of-sale device.

5. A hearing-impaired payment system comprising:
   a cardholder implantable hearing device, and
   a cardholder mobile smartphone comprising:
   a display device;
   a memory device for storing data, said memory device including thereon one or more audible instructions stored as digital audio signals; and
   a processor communicatively coupled to the memory device and the display device, wherein the processor is programmed to:
   start a digital wallet application, wherein the digital wallet application comprises a hearing-impaired functionality and an input icon for activating the hearing-impaired functionality, the input icon presented for display on a user interface presented on the display device;
   receive input from the input icon upon the input icon being triggered;
   in response to receiving the input, activating the hearing-impaired functionality on the digital wallet application, the hearing-impaired functionality including a data-driven and predictive chatbot functionality;
   upon activating the hearing-impaired functionality, transmit a first digital audio signal to the cardholder implantable hearing device, the first digital audio signal corresponding to one of the one or more audible instructions;
   establish communication to a point-of-sale device;
   upon establishing communication, create a chat session with the point-of-sale device via the chatbot functionality, the chat session allowing real-time interactive communication with the point-of-sale device;
   upon creating the chat session, receive a hearing-impaired communication from the point-of-sale device;
   pair the cardholder mobile smartphone to the cardholder implantable hearing device via a wireless communication protocol;
   upon pairing the cardholder mobile smartphone to the cardholder implantable hearing device, transmit a second digital audio signal to the cardholder implantable hearing device via the wireless communication protocol, the second digital audio signal comprising hearing device control data; and
   disabling a microphone of the hearing device via the hearing device control data.

6. The hearing-impaired system of claim 5, wherein the hearing-impaired communication includes a chatbot-facilitated communication between the digital wallet application and the point-of-sale device.

7. The hearing-impaired system of claim 5, wherein the hearing-impaired functionality comprises converting all transactional information to a cardholder into readable text form.

8. The hearing-impaired system of claim 7, wherein receiving the hearing-impaired communication comprises the processor being programmed to receive one or more text messages from the point-of-sale device.

9. A non-transitory computer-readable storage media having computer-executable instructions, when executed by at least one processor, the computer-executable instructions cause the processor to:
 start a digital wallet application on the cardholder mobile smartphone, wherein the digital wallet application comprises a hearing-impaired functionality and an input icon for activating the hearing-impaired functionality, the input icon presented for display on a user interface of the cardholder mobile smartphone;
 receive input from the input icon upon the input icon being triggered;
 in response to receiving the input, activating the hearing-impaired functionality on the digital wallet application, the hearing-impaired functionality including a data-driven and predictive chatbot functionality;
 upon activating the hearing-impaired functionality, transmit a first digital audio signal to a cardholder implantable hearing device via the cardholder mobile smartphone, the first digital audio signal corresponding to a first audible instruction;
 after transmitting the first audio signal, couple the cardholder mobile smartphone in communication to a point-of-sale device;
 transmit digital wallet data from the digital wallet application to the point-of-sale device;
 upon transmitting of the digital wallet data, receive a hearing-impaired communication from the point-of-sale device;
 upon receiving the hearing-impaired communication, transmit a second digital audio signal to the cardholder implantable hearing device, the second digital audio signal corresponding to a second audible instruction;
 pair the cardholder smartphone to the cardholder implantable hearing device via a wireless communication protocol;
 upon pairing the cardholder smartphone to the cardholder implantable hearing device, transmit a third digital audio signal to the cardholder implantable hearing device via the wireless communication protocol, the third digital audio signal comprising hearing device control data; and
 disable a microphone of the cardholder implantable hearing device via the hearing device control data.

10. The non-transitory computer-readable storage media of claim 9, wherein the hearing-impaired functionality comprises a chatbot functionality.

11. The non-transitory computer-readable storage media of claim 10, wherein the computer-executable instructions further cause the processor to facilitate a chatbot-facilitated communication between the digital wallet application and the point-of-sale device.

12. The non-transitory computer-readable storage media of claim 9, wherein the hearing-impaired functionality comprises converting all transactional information to a cardholder into readable text form and wherein the computer-executable instructions further cause the processor to receive one or more text messages from the point-of-sale device.

* * * * *